(12) United States Patent
Ye

(10) Patent No.: US 11,958,602 B2
(45) Date of Patent: Apr. 16, 2024

(54) INTEGRATED ENGINEERING SYSTEM THAT COMBINES MULTIPLE DRONES AND AN ELECTRO-MECHANICAL DRONE TRANSPORTATION SYSTEM TO ACHIEVE A NEW METHOD OF AVIATION TRANSPORTATION

(71) Applicant: Jianfei Ye, Houston, TX (US)

(72) Inventor: Jianfei Ye, Houston, TX (US)

(*) Notice: Subject to any disclaimer, the term of this patent is extended or adjusted under 35 U.S.C. 154(b) by 518 days.

(21) Appl. No.: 16/938,915

(22) Filed: Jul. 25, 2020

(65) Prior Publication Data

US 2022/0024578 A1   Jan. 27, 2022

(51) Int. Cl.
*B64C 39/02* (2023.01)
*B64U 80/86* (2023.01)
*B64U 101/00* (2023.01)
*B64U 101/60* (2023.01)

(52) U.S. Cl.
CPC .......... *B64C 39/024* (2013.01); *B64U 80/86* (2023.01); *B64U 2101/00* (2023.01); *B64U 2101/60* (2023.01); *B64U 2201/102* (2023.01)

(58) Field of Classification Search
CPC ........... B64C 39/024; B64C 2201/126; B64C 2201/128; B64C 2201/143; B64C 2201/203; B64C 2201/208; B64U 80/86
USPC .......................................................... 701/3
See application file for complete search history.

(56) References Cited

U.S. PATENT DOCUMENTS

| | | | |
|---|---|---|---|
| 4,036,147 A * | 7/1977 | Westling | B64F 3/02 104/23.1 |
| 5,653,174 A * | 8/1997 | Halus | H02K 41/02 104/282 |
| 6,202,566 B1 * | 3/2001 | Hutchinson | B61B 15/00 104/126 |
| 9,718,564 B1 * | 8/2017 | Beckman | B61L 23/00 |
| 10,322,729 B2 * | 6/2019 | Suppes | B64C 39/022 |
| 10,860,115 B1 * | 12/2020 | Tran | B64D 47/08 |
| 10,899,475 B1 * | 1/2021 | Freeman, Jr. | B64C 39/024 |
| 11,374,415 B2 * | 6/2022 | Schweitzer | B64C 39/024 |
| 11,518,512 B2 * | 12/2022 | Groninga | G01R 31/085 |
| 11,524,596 B2 * | 12/2022 | Cheng | B60L 53/65 |
| 11,524,781 B1 * | 12/2022 | Freeman | B64C 39/024 |
| 2018/0095468 A1 * | 4/2018 | Yang | H02J 50/05 |

(Continued)

FOREIGN PATENT DOCUMENTS

CN       109532911 A *  3/2019

*Primary Examiner* — Joshua E Rodden

(57) ABSTRACT

An integrated engineering system including multiple drones and an Electro-Mechanical drone transportation system for a new method of aviation flight transportation by the drones. These drones can be used either for passenger transportation or for parcel delivery. These drones may fly to land onto or fly to attach to carriers of the Electro-Mechanical drone transportation system then travel a distance with the carriers as unified objects. This integrated engineering system facilitates a novel method of aviation flight transportation by drones by uplifting a limit of maximum travel distance of the drones, hence making those drones a more practical tool for future aviation transportation within a city or between the cities. The Electro-Mechanical drone transportation system may include multiple routes to form a complicated transportation network to increase the number of potential destinations for the drones.

8 Claims, 5 Drawing Sheets

(56) References Cited

U.S. PATENT DOCUMENTS

| | | | |
|---|---|---|---|
| 2018/0257502 A1* | 9/2018 | Park | H02J 50/12 |
| 2018/0265098 A1* | 9/2018 | Evans | B61B 1/02 |
| 2018/0265295 A1* | 9/2018 | Beckman | B61D 17/16 |
| 2019/0112046 A1* | 4/2019 | Lery | B64D 47/08 |
| 2019/0144007 A1* | 5/2019 | Lum | B61B 3/02 |
| | | | 105/150 |
| 2020/0001993 A1* | 1/2020 | Kirkbride | B64C 27/20 |
| 2021/0316874 A1* | 10/2021 | Resnick | B60L 58/12 |
| 2022/0045489 A1* | 2/2022 | Yang | B61B 7/06 |
| 2022/0108273 A1* | 4/2022 | Miyata | G05D 1/1062 |
| 2022/0274632 A1* | 9/2022 | Read | B61B 7/06 |

\* cited by examiner

INTEGRATED ENGINEERING SYSTEM THAT COMBINES MULTIPLE DRONES AND AN ELECTRO-MECHANICAL DRONE TRANSPORTATION SYSTEM TO ACHIEVE A NEW METHOD OF AVIATION TRANSPORTATION

CROSS-REFERENCE TO RELATED APPLICATIONS

Not Applicable

STATEMENT REGARDING FEDERALLY SPONSORED RESEARCH OR DEVELOPMENT (IF APPLICABLE)

Not Applicable

REFERENCE TO SEQUENCE LISTING, A TABLE, OR A COMPUTER PROGRAM LISTING COMPACT DISK APPENDIX (IF APPLICABLE)

Not Applicable

BACKGROUND OF THE INVENTION

This invention is directed to an integrated engineering system which is based on a combination of multiple drones and an innovative Electro-Mechanical drone transportation system into one system. Therein said Electro-Mechanical drone transportation system may transport said drones in a middle of their aviation flight journey to increase the limit of maximum aviation flight distance of said drones, hence to make aviation transportation by drones a more practical way for daily aviation transit in the cities or between cities to overcome the limitation of electricity density of battery or limited capacity of fuel tank of said drone its own.

This invention is to achieve a new method of aviation transportation by drones, either for passenger transportation or for parcel delivery, which will be explained more precisely in Details of the Invention.

In this invention an Electro-Mechanical engineering system is defined as a system combines processes and procedures drawn from electrical engineering and mechanical engineering. The phrase of "Electro-Mechanical" focuses on the interaction of electrical and mechanical systems as a whole and how the two systems interact with each other.

Being specific, this Electro-Mechanical drone transportation system is configured to be either in a form of a Magnetic Levitation Path system, or a rail transportation system based on Electro-Mechanical technology, or an Electro-Mechanical suspension cable system, or a hybrid of any of above.

In this invention Magnetic Levitation (Maglev as abbreviation for Magnetic Levitation) path system are defined as a system of carrier transportation that uses two sets of magnets, one set to repel and push the carrier above Maglev path up off in the air slightly, and another set to move the elevated Maglev carrier ahead, taking advantage of the lack of friction. The earliest Maglev rail system and its related technology was originated in Germany.

In this invention these carriers floating on those Maglev magnets can be special-designed to be very short in length, so that a Maglev carrier may even only host one drone to land on the top for a ride. Of course said Maglev carrier can be longer in length so it is configured to give several drones for a ride at a time.

In this invention a rail transportation carrier system based on Electro-Mechanical technology is defined as a transportation system that typically includes single rail or two parallel rails, or even more parallel rails, so that Electro-Mechanical rail transportation carrier with wheels may travel forward to give said drones a ride. In this invention said drone may fly by itself then land on or attach to special-designed rail transportation carrier with wheels then travel forward with said carrier as a combined object.

In this invention Electro-Mechanical suspension cable system is defined as a type of Electro-Mechanical system that rotates an endless suspension cable so that everything attaching to this cable may move forward in one direction. A typical Electro-Mechanical suspension cable system is the cable car system nowadays which often can be seen in ski resorts. In this invention, said drone may fly by itself from a location of departure then attach itself to said suspension cable via a docking device, so that said drone can travel forward on this rotating suspension cable system like a cable car nowadays to save or avoid using energy of said drone its own.

In this invention drones are defined as a type of unmanned aerial vehicle that sustains flight mainly through remote control, on-board autopilot control or control by a pilot in case of an emergency. They are also often referred to a type of drone which can lift itself up, fly or hover with typically 4 or 6 or even 8+ axis, each axis includes a motor and a set of propeller, to enable the drone lift up or land nearly in vertical direction, these drones are also called as multi-copter, while its four-axis version is also often called as Quad-copter or Quadrone. In this invention said drones are configured to be electrical battery powered, or in some cases, fuel powered, hydrogen powered or fuel cell powered, or a hybrid of any of above.

As being said above, said multiple drones being transported by said Electro-Mechanical drone transportation system are either being transported by, said rail transportation carrier with wheels, or said Maglev carrier, or said suspension cable carrier. In this invention these rail transportation carriers with wheels, or Maglev carriers, or said suspension cable carriers, are generally called as "carriers".

That is to say if it is being said in reversed way, in this invention the carriers on said Electro-Mechanical drone transportation system can be referred to a special-designed Maglev carrier if said Electro-Mechanical drone transportation system is a Maglev transportation system; or can be referred to a special-designed Electro-Mechanical rail transportation carrier with wheels if said Electro-Mechanical drone transportation system is a rail transportation system based on Electro-Mechanical technology; or can be referred to a cable carrier if said Electro-Mechanical drone transportation system is a suspension cable system.

Said Electro-Mechanical drone transportation system may includes multiple carriers, even thousands of them. That is to say, there can be as many as hundreds of or thousands of carriers moving along said rail, or said Maglev Path or said suspension cable simultaneously, to host thousands of drones and give them a ride at one time, like the scenario of thousands of cars you will see in the freeway system nowadays.

Said drones in this invention may not be those industrial or commercial drones available in the market nowadays when the patent document is written, that is to say, those industrial or commercial drones nowadays may not be directly comply with or may not be directly integrated into this invented engineering system.

Being specific, each of said drones have a build-in wireless communicating module or device so that each of said drone may communicate with other drones in this invented integrated engineering system, to avoid collision with each other in the air; Meanwhile each of said drone may communicate with said Electro-Mechanical drone transportation system directly or indirectly, so that each of said drones can make a reservation for a carrier in vacancy prior to its landing or attaching.

Therein the phrase of "directly or indirectly" means that each of said drones may either directly communicate with said Electro-Mechanical drone transportation system to make a reservation, or via a central computer system or information system of this invented system, mostly likely a computer server or a computer server cluster, to make a reservation for a carrier.

Said wireless communication modules or devices related with this integrated system is configured to be based on 4G, 5G or any other wireless technologies. Usually there will be a unified wireless communicating protocol among all communicating devices being included in this invented integrated engineering system so that every participant of the invented system, such as said drones, said Electro-Mechanical drone transportation system, as well as said carriers, may exchange unencrypted and encrypted data among them. In a nut shell, in this integrated engineering system the wireless communication plays a key role to combine multiple drones and a Electro-Mechanical drone transportation system into one system.

Also each of said drones in this invention may have a docking device so that said drone may land on or attach to the carrier of Electro-Mechanical drone transportation system firmly. Said drones related with this invented system may look different in shape and in color as they might be manufactured by different drone makers, however said drones of the invention may have standard or unified design for docking devices so they are configured to dock to any of carriers on said Electro-Mechanical drone transportation system.

Current commercial drones or industrial drones for passenger or parcel transportation are either in concept validation stage or in product development stage, while some development teams have claimed that these commercial or industrial drones may carry up to two passengers and travel up to 30-40 km at ideal weather condition, but still, there is a major problem for current drones with its flight sustainability: traditional drone uses significant portion of its battery power to offset gravity of the Earth to keep itself remaining in the air during flight, also it is extremely difficult to trade-off between the weight of the battery and the limit of maximum flight distance, if said drone in this invention is powered by electricity. That is why the most of electrical car nowadays can travel more than 500 kilometers at a time meanwhile those traditional drones can only travel a distance which is only approximately $1/15$ of that of an electrical car. That is to say, with the limit of energy density of battery technology nowadays, current flight sustainability of industrial or commercial drones is fundamentally insufficient to make themselves a practical tool for transportation against all weather conditions.

While this invention facilitates such a new method of aviation transportation, by giving said drones a ride in a middle of their flight, said drone transportation system may help drone to dramatically uplift its maximum flight distance.

By lifting the limit of maximum travel distance of a drone, this invention may fundamentally reshape future transportation, such as the aviation transportation in the city or between the cities, because said drones may simply fly a short distance to the nearest route of said Electro-Mechanical drone transportation system then let the carriers of said Electro-Mechanical drone transportation system to transport said drone to complete the rest of the journey.

In the future a city may both have a freeway system for vehicles and an integrated engineering system of this invention for drones. These two transportation systems may co-exist in a city and mutually complement each other for a stereoscopic transportation system and make transportation in the future a very different one from that of nowadays. In the future this invention may also help human beings to expand livable territory to those mountainous area because said drones in this invention may replace the transportation system based on roads and vehicles.

BRIEF SUMMARY OF THE INVENTION

This invention is directed to an integrated engineering system that combines multiple drones and an Electro-Mechanical drone transportation system which may transport said drones, into one system. Said Electro-Mechanical drone transportation system is configured to be either in a form of an Electro-Mechanical suspension cable system; or a system of multiple rail transportation carriers with wheels based on Electro-Mechanical technology, or a Magnetic Levitation [Maglev] Path System, or a hybrid of any of above.

In a middle of flying journey, said drones are configured to be transported either by Maglev carriers, or by rail transportation carrier with wheels, or by cable carriers of said Electro-Mechanical drone transportation system. These three types of transportation vehicles can be defined as "drone carrier".

This invention is invented for a new method of aviation transportation by drones, either for passenger transportation or for parcel delivery.

By being transported by such an Electro-Mechanical drone transportation system, said drones may save their own energy expenditure per mile traveled hence increase the maximum travel distance and flying sustainability.

A new method of aviation transportation of drones in this invention can be described as follow: A drone lifts off from the location of departure, flies for a distance in the air by itself, then fly-to-attach to or fly-to-land onto a moving carrier of said Electro-Mechanical drone transportation system, then said drone may move forward together with said carrier as a combined object.

Said Electro-Mechanical drone transportation system may includes multiple routes to form a network of routes, so that said drone may switch its travel path from one route to another during the journey, to reach more potential destinations. That is similar with the scenario of a passenger travelling in New York City subway system which includes multiple routes of subway lines. Upon getting closer to its destination, said drone may detach itself or lift off from said carrier then fly by itself in the air, and eventually land itself on its final destination.

The impact of uplifting the drones' travel sustainability is not only to make drones travel a greater distance to reach a further destination, but also to make a drone travel safer against all weather conditions. This invention may reshape the future transportation in the city or between cities, it may also expand the livable areas for human on Earth because those mountainous terrains may become more livable since such an invented drone aviation transportation method is configured to replace the role of road, freeway system for passenger and cargo transportation, while road and freeway system usually require less-mountainous terrain.

DETAILED DESCRIPTION OF THE INVENTION

This invention is related to an engineering system that integrates multiple drones and an Electro-Mechanical drone transportation system which is configured to transport drones.

Figure 1:
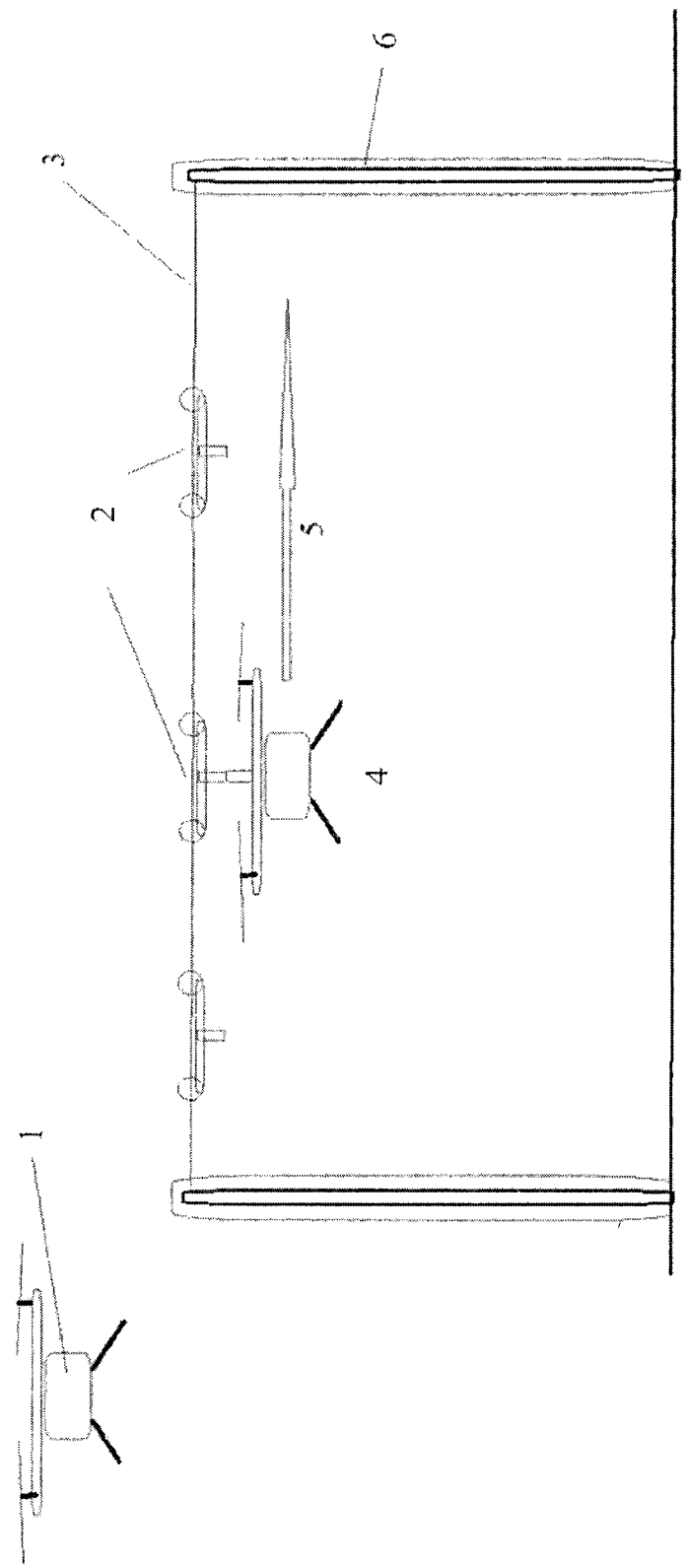
FIG. 1: This drawing shows an engineering system of this invention involving multiple drones such as 1 and 4 in FIG. 1, and so on, and an Electro-Mechanical drone transportation system, therein said drones such as the drone 4 travel forward along the moving cable carrier 2 of said suspension cable-carrier system which is driven by electrical motors to drive the cable 3, the cable carriers such as carrier 2 and said drones 4 attached to the cable carriers moving forward.
Figure 2:
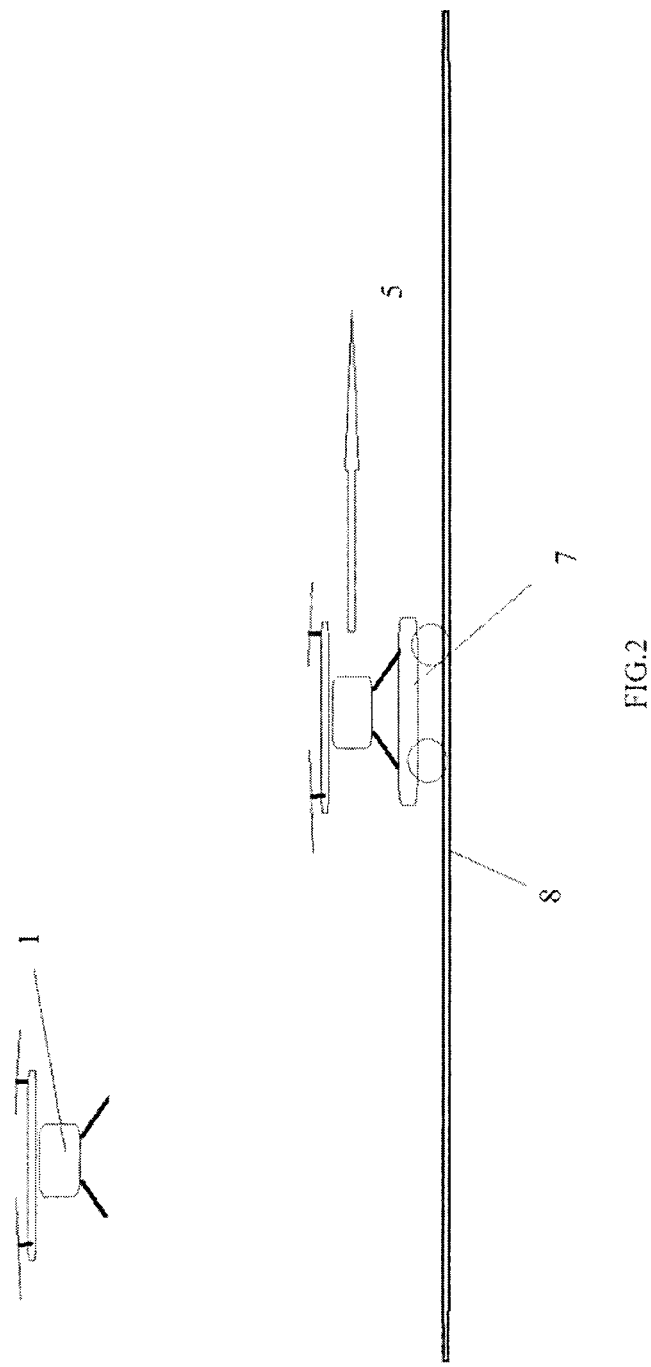
FIG. 2: This drawing shows an engineering system of this invention involving multiple drones and an Electro-Mechanical drone transportation system, therein said drones 1 travel forward along with the carriers 7 in rail transportation system 8 or Maglev Path System, to facilitate a new method of aviation transportation either for passenger or parcel delivery.

Said Electro-Mechanical drone transportation system is configured to be either in a form of an Electro-Mechanical suspension cable system as exhibited in FIG. 1, or a rail transportation system based on Electro-Mechanical technology as exhibited in FIG. 2, or a Magnetic Levitation path system, or a hybrid of any of above.

Said drones 1 and said Electro-Mechanical drone transportation system are integrated by special-designed docking devices, wireless communicating devices and an dispatch system etc. so that the drones and said Electro-Mechanical drone transportation system may work together accordingly to achieve a new method of aviation transportation by drones.

Said new method of aviation transportation by drones can be described as follows: A drone takes off from location of departure, flies a distance, then attaches itself to or lands itself onto a carrier 2 of said Electro-Mechanical drone transportation system, then said drones may travel forward together with said carrier 2 as a combined object. This new method of aviation transportation helps drone to save its energy consumption during travel hence uplifts the maximum travel distance of a drone.

Usually said drones fly within a certain range of altitude which is legally regulated for drones in that region, for example within a range of 300 ft-600 ft altitude. Also usually said drones take off or land vertically according to the prevailing flight regulations for commercial drones.

Said Electro-Mechanical drone transportation system may include multiple carriers similar with the carrier 2 which are running along either suspension cable 3, or rail 8, or Magnetic Levitation path, so each of said drones may fly to attach itself to or land itself onto a carrier 7, then the carrier 7 may carry the drone 1 to travel forward as a combined object along said suspension cable 3, or rail 8, or Maglev Path.

In this invention, the carrier on said Electro-Mechanical drone transportation system can be referred to a special-designed Magnetic Levitation Carrier if said Electro-Mechanical drone transportation system is a Magnetic Levitation Path system; or a special-designed rail transportation carrier 7 with wheels if said Electro-Mechanical drone transportation system is a rail transportation system based on Electro-Mechanical technology; or a movable cable carrier 2 if said Electro-Mechanical drone transportation system is a suspension cable carrier system.

However said Magnetic Levitation carrier or said rail transportation carrier 7 with wheels, which are defined as two different types of carriers in this invention, could be very short in length, so that either said Magnetic Levitation Carrier or said rail transportation carrier 7 with wheels is configured to be only good for one drone 1 to park on the top of one carrier 7 at a time. Meanwhile hundreds or even thousands of these special-designed carriers similar with the carrier 7 may move along said Magnetic Levitation path, or rail 8, or suspension cable 3, to transport a significant number of drones simultaneously.

Figure 3:
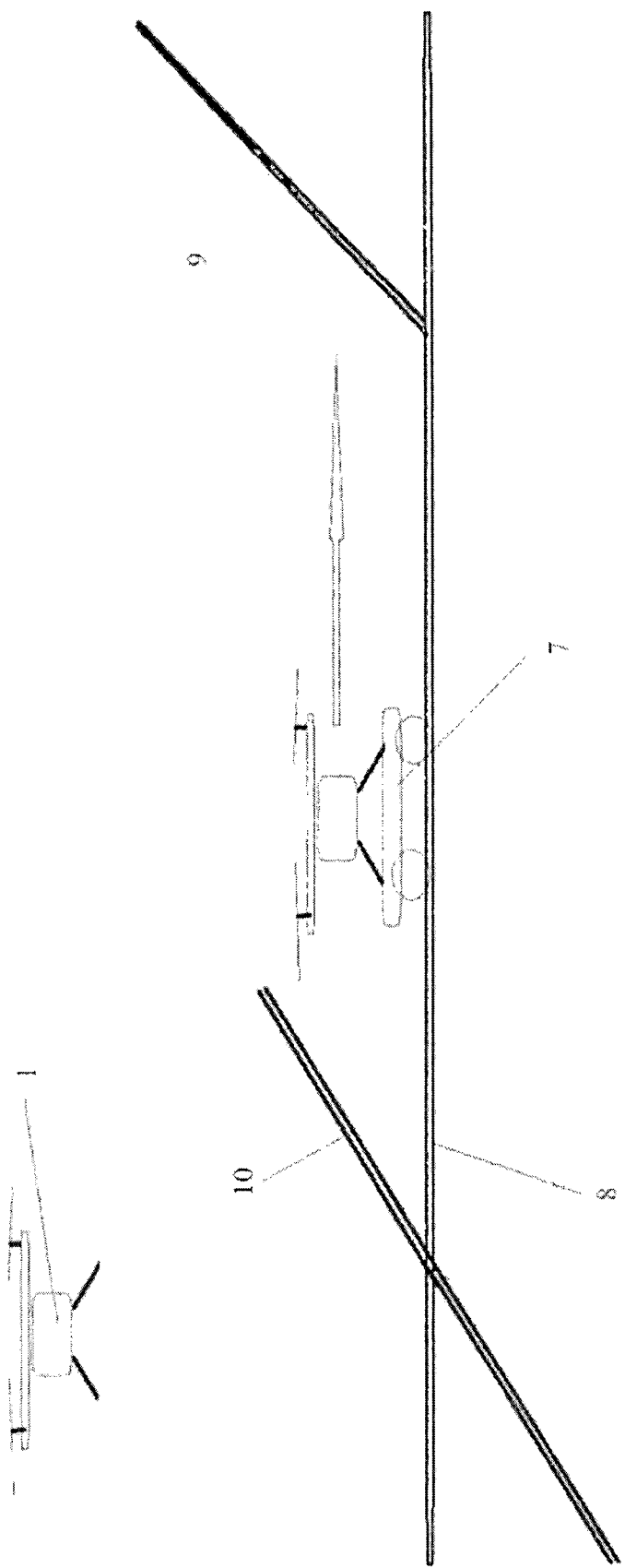
FIG. 3: This drawing shows an engineering system of this invention comprising multiple routes 8, 9, 10 of either Maglev Transportation Path System or Suspension Cable Carrier System or Rail Transportation System to form a complicated ground transportation network comprising multiple routes.

In this invention, a segment of Magnetic Levitation path, or rail 8, or suspension cable 3 with no divergence can be defined as a route. Said Electro-Mechanical drone transportation system may either have only one route 8, or multiple routes such as route 8, route 9 and route 10 in FIG. 3, so that the drones are configured to switch its travel path from one route to another to reach more potential destinations. It is similar with the scenario in New York subway that a passenger may transfer from Green Line to Yellow Line to reach more NYC subway stations. Upon getting close to the intersection of Route A to Route B, if said drone is about to transfer from Route A to Route B, it may detach itself and take off from the first carrier 7 on Route A, fly a short distance then land on or attach to a designated carrier on Route B, then continue its journey along Route B. There is also another optional technical solution that the carriers may switch its path from one route to another by a lane changer which is similar with the one helping traditional train to switch rails.

A route of this drone transportation system can be two-way directional so that thousands of drones may travel back-and-force in two directions along this route, similar with the scenario of a freeway system nowadays for vehicles. A scenario of this kind of transportation activities in this invention can be as magnificent as freeway system nowadays in a mega US city.

Some special-designed docking devices, a wireless communicating system solution and an dispatch system facilitate the integration of multiple drones and Electro-Mechanical drone transportation system, so that multiple drones may work with said Electro-Mechanical drone transportation system accordingly to achieve said new method of aviation transportation for drones, meanwhile to minimize the risk of collision in the air among said drones and to maximize the utilization of carriers.

A special-designed docking device helps to combine said drone 1 with said carrier 7 firmly then travel forward as a combined object. The same docking device also is configured to be released from said drone when this drone is about to take off from said carrier.

Each said drone may have a wireless communicating device on board for this drone to communicate with other drones and/or said Electro-Mechanical drone transportation system. A cluster of wireless communicating devices both in said drones and said Electro-Mechanical drone transportation system form a wireless communicating network of this invented engineer system, to enable said drones, said Electro-Mechanical drone transportation system to exchange unencrypted data and encrypted data among them.

Dispatch System in the invented engineering system may include three major sub-systems:

A: Flight Coordination and Anti-Collision Sub-System.

This Sub-system working with said wireless communicating network is to prevent collision of said drones during their flight. That is to say, during the flights said drones 1 may directly exchange flight data to each other such as location of departure, final destination, flight speed, preset flight routes, real-time flight routes, altitude, wind speed, GPS locations etc. so that each of them is configured to optimize travel routes to avoid collision in the air. Meanwhile said drones may also exchange flight related data with a central server or a server cluster, so that central processing system is configured to coordinate between said drones and said Electro-Mechanical drone transportation system to schedule flight routes and timetable for each drone.

B: The Carrier Vacancy Reservation Sub-System.

This sub-system is to facilitate vacancy-reservation activities among said drones and the carriers 2 or 7 on said Electro-Mechanical drone transportation system, so that said drone 1 is configured to reserve a vacancy on carrier during its flight in the air, or even before said drone takes off from its location of departure.

A typical example of a reservation procedure could be described as, but not limited to, following paragraph:

Said drone 1 may submit a request for a ride to said central server of the system of this invention and send related data of its purposed journey such as GPS of location of departure and destination etc., as the next step the central server may plan a travel route, then assign a carrier 2 or 7 on this route for this drone to land onto or attach to. Thus usually this vacancy on the carrier will no more be assigned to other drones unless this journey is canceled or accomplished.

Once said drone 1 flies by itself to land on or attach to this designated carrier, it may travel forward along with this designated carrier for a distance as a combined object. Upon getting close to its destination, said drone may detach itself and take off from this designated carrier 2 or 7, then flies by itself again for a distance and land itself on its final destination. Once said drone left the carrier, the vacancy of carrier it used to occupy immediately becomes available for other drone to preserve.

Section C: Real-Time Wireless Transaction and Payment Sub-System

This sub-system works between said drone and said Electro-Mechanical drone transportation system, so that said drone is configured to preserve a vacancy on a carrier of said Electro-Mechanical drone transportation system via this wireless payment transaction and payment sub-system. In the most common cases, upon said drone makes the reservation, the owner of said drone will be charged for a fee by the owner of said Electro-Mechanical drone transportation system. Hence this invention can be also related with a business model of "toll road" based on rule of pay-for-use.

In this invention, if said Electro-Mechanical drone transportation system is a rail transportation system or Maglev path system, then a portion of the rail, or Maglev rail is configured to be placed in a tube for weather-proof purpose, so said drones are configured to travel forward in tube against all weather conditions.

Figure 4:
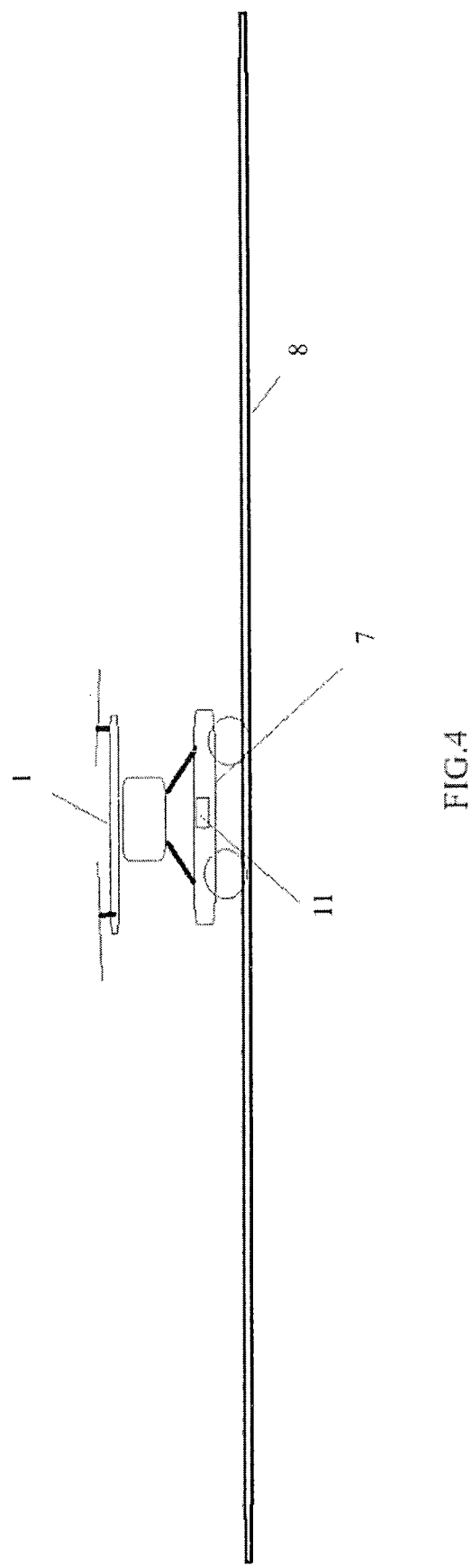
FIG. 4: This drawing shows the battery of said drone is being charged by electrical charging module 11 while said drone is traveling along said drone transportation system which can be either a suspension cable system, or a rail transportation carriers system, or magnetic levitation system.
Figure 5:
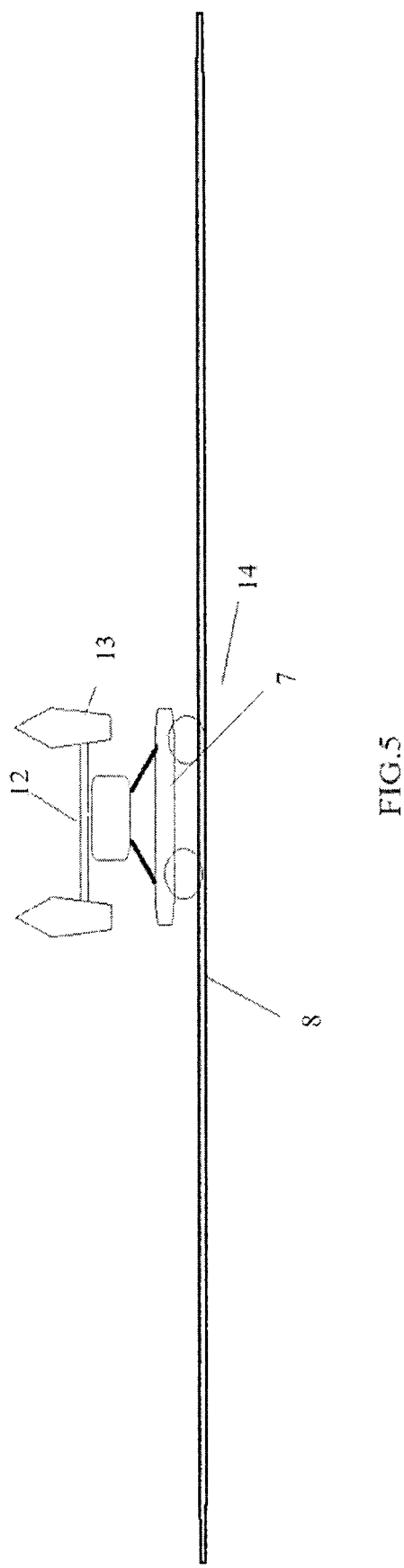
FIG. 5: This drawing shows an engineering system of this invention comprising multiple drones 12 with rocketry engine 13 and electro-Mechanical drone transportation system comprising 7 and 8, to fly on extraterrestrial planets 14.

As an optional feature, a set of non-touch basis electricity charging devices 11 as exhibited in FIG. 4 are configured to be installed on said carriers 2 or 7 of this invention, or be simply installed along said Electro-Mechanical drone transportation system. These devices may conduct non-touch basis electricity-charging towards said drone's battery when said drone is still moving forward together with said carrier as a combined object.

Another important feature which can be associated with this invented integrated engineer system is that it may work with smart phone apps so mass consumers may use smart phone to call for said drone for a Uber® or UberEats®-like passenger or parcel delivery aviation transportation service. In the app the consumer may setup a pick-up location and destination, or choose from a list of them, so a nearby drone is configured to fly over to pick up the passengers or the parcel upon a requests then fly to the nearest route of Electro-Mechanical drone transportation system to join thousands of drones being transported in said drone transportation system.

There are also a few other commercial application scenarios or business models related with this invention, such as: a. large scale parcel delivery service by drones; b. a public aviation transportation system based on the rules of pay-for-use. etc. These are configured to be either for-profit or for-nonprofit applications.

A parcel delivery service by drones related with this invention can be used by parcel shippers such as USPS® or Amazon® etc., these parcel shippers may even be licensed by inventor to build their own drone transportation system of this invention in a city, so the parcel delivery drones are configured to travel a longer distance with assistance of the multiple routes of said drone transportation system, to reach more potential destinations for parcel delivery. Also, said Electro-Mechanical drone transportation system is configured to even be build between cities so the parcels can be shipped from one city to another.

A public aviation transportation application related with this invention may be referred to the scenario that the private owners of drones may own their private drones, then use a public Electro-Mechanical drone transportation system for daily commute by drones, still a "toll road" model based on rules of pay-for-use. Thus both the manufacturers of said drones and the builder of Electro-Mechanical drone transportation system is configured to make a profit because the manufacturers of said drones can sell their drones to mass consumers meanwhile the builder of said drone transportation system may get daily revenue via "toll".

A typical pricing model related with this invention, but not limited to, is the builder of said drone transportation system may charge the owners of drones for every mile the drone being transported by said drone transportation system. The rate may vary between peak time and off-peak time, and it also may vary from different application scenarios such as passenger transportation or parcel delivery.

Another type of public aviation transportation application related with this invention may involve some special-designed drones with capacity of many passengers like a public bus, these drones are configured to fly over and stop at multiple pick-up locations to pick up passengers, then fly to a nearby route of drone transportation system to complete the rest of the journey.

A Electro-Mechanical drone transportation system in this invention may transport both said drones for parcel delivery and said drones for passenger simultaneously, just like the freeway system nowadays which can accommodate thousands of passenger vehicles and cargo vehicles simultaneously.

The invention claimed is:

1. An engineering system comprising:
   multiple drones;
   an electro-mechanical drone transportation system which is configured to transport said drones;
   said electro-mechanical drone transportation system including multiple carriers in the form of any combination of: a suspension cable carrier system, a magnetic levitation transportation system, and a rail transportation system including multiple carriers on wheels;
   said electro-mechanical drone transportation system configured to perform the steps of: in a middle of a flight journey said drones are configured to be transported by said carriers of the electro-mechanical drone transportation system, so that said drones are configured to increase a limit of aviation flight distance;
   said drones are configured to directly or indirectly communicate with said electro-mechanical drone transportation system via wireless communication, so that said drones are configured to attach to or to detach from the carriers of said electro-mechanical drone transportation system accordingly.

2. The engineering system described as claim 1, wherein a portion of said electro-mechanical drone transportation system is placed in a tube for weather proof purpose.

3. The engineering system described as claim 1, wherein said electro-mechanical drone transportation system has multiple divergences, crossroads and routes to make up a complicated mixed flight-and-ground transportation network to assist said drones to reach multiple destinations in greater distance.

4. The engineering system described as claim 1, wherein said engineering system is configured to work with a smart phone application, or a smart phone app, to enable passengers, or customers, or smart phone users, to call for said drones via smart phone to offer a type of passenger transport to parcel delivery aviation services by said drones.

5. The engineering system described as claim 1, wherein said electro-mechanical drone transportation system comprises multiple wireless electricity charging devices attached to some of said carriers or installed along transportation routes to charge said drones when said drones are being transported.

6. The engineering system described as claim 1, wherein said electro-mechanical drone transportation system has multiple parking lots, so said drones are configured to be left by passengers inside these parking lots, and transfer the passengers to land transportation vehicles.

7. The engineering system described as claim 1, wherein said drones are configured to use rocketry engines so that the engineering system is configured to be used on extraterrestrial objects or extraterrestrial planets.

8. A method of drone aviation transportation using said engineering system described as claim 1, the method of drone aviation transportation including a phase of transportation during which said electro-mechanical drone transportation system transports said drones in the middle of said flight journey so said drones do not use energy reserves.

* * * * *